UNITED STATES PATENT OFFICE.

WILLIAM G. LINDSAY, OF NEW YORK, N. Y., ASSIGNOR TO THE CELLULOID COMPANY, OF NEW YORK, N. Y., A CORPORATION OF NEW JERSEY.

SOLVENT FOR ACETYL CELLULOSE.

1,027,619.  Specification of Letters Patent.  Patented May 28, 1912.

No Drawing.  Application filed August 25, 1911.  Serial No. 646,066.

*To all whom it may concern:*

Be it known that I, WILLIAM G. LINDSAY, a citizen of the United States, residing in the city of New York, State of New York, have invented certain new and useful Improvements in Solvents for Acetyl Cellulose, of which the following is a specification.

The various compositions to which the present invention relates are employed in the arts, namely, as imitations of natural substances and in films used for photographic and therapeutic purposes, and consist of soluble acetyl cellulose combined with or dissolved in certain other substances or menstrua.

Although the final or useful form of the different compounds of this class is that of a solid or dried material, the different processes of conversion into this final solid form involve, as is well understood, the employment of solutions or mixtures of varying consistency as to plasticity, stiffness or fluidity dependent generally upon the proportion and kind of solvent used to the amount of the soluble acetyl cellulose.

There are two classes of solvents; liquids which are solvents in themselves, such as epichlorhydrin, dichlorhydrin, acetone, etc.; and solvents which are formed by combining two or more substances with each other. The components of the mixed solvent in such a case may not necessarily be possessed of individual solvent power; for instance, in the case of nitrocellulose ethyl alcohol, which is practically a non-solvent in itself forms a good solvent mixture when camphor is dissolved in it. The various applications of this art require the employment of complex mixtures in the solvent—single substances being rarely used for such purpose. Hence, while the advancement of the art has depended largely on the discovery and application of new single solvents yet it has also required the invention of combinations of solvents by which effects are produced quite different from those produced when single solvents are employed alone.

The action of some solvents or diluents is quite distinct from that of others in that they require a shorter or longer time for seasoning of the material and the evaporation of the more volatile solvents is restrained by that of the less volatile ingredients so that the resulting solid is homogeneous, without air bubbles, without marks, and is pellucid or even transparent and translucent.

It is well known that there are some varieties of acetyl cellulose which are soluble in acetone, but the films produced by a solution of acetyl cellulose in acetone often are not films or solid bodies having all the properties desired.

I have discovered that acetyl cellulose films having great flexibility, translucency and of a permanent nature can be produced by adding to a solution of acetyl cellulose in acetone a non-solvent liquid such as benzylbenzoate. Benzylbenzoate is a non-solvent of acetyl cellulose by itself and in its application is merely compatible with the other solvents used and does not exercise any independent solvent power of its own, so far as I have been able to discover, although its action, of course, may be modified by admixture with the other solvents. At all events I have discovered that benzylbenzoate, a non-solvent of acetyl cellulose by itself but possessing a low volatility, exerts a beneficial effect upon a solution of acetyl cellulose in acetone or other single or mixed solvents which have a high volatility.

As one example of carrying out my invention I proceed as follows: I dissolve one part of acetyl cellulose in ten parts (by weight) of acetone, to this mixture I add .2 parts of triphenylphosphate, or similar substance, and .01 part of urea and from 2 to 5 parts of benzylbenzoate. The film produced by the evaporation of this solution has great flexibility and does not become brittle and disintegrate in any appreciable length of time. It will be understood, of course, by those skilled in the art that these precise proportions of ingredients are not essential, and therefore I do not limit myself to these specific proportions.

Having thus described my invention, what I claim is:

1. A composition of matter consisting of acetyl cellulose dissolved in a solvent of relatively high volatility to which benzylbenzoate has been added, substantially as described.

2. A composition of matter consisting of acetyl cellulose dissolved in acetone to which benzylbenzoate has been added, substantially as described.

WILLIAM G. LINDSAY.

Witnesses:
MABEL DENTON,
J. E. HINDON HYDE.